US012320675B2

(12) United States Patent
Gregory et al.

(10) Patent No.: US 12,320,675 B2
(45) Date of Patent: Jun. 3, 2025

(54) DUAL TRANSCEIVER BOARD MODULE

(71) Applicants: Michael Lee Gregory, Hallsville, TX (US); Jason Edward Pintok, Lake Mary, FL (US); Ian Harvey, Bristol (GB)

(72) Inventors: Michael Lee Gregory, Hallsville, TX (US); Jason Edward Pintok, Lake Mary, FL (US); Ian Harvey, Bristol (GB)

( * ) Notice: Subject to any disclaimer, the term of this patent is extended or adjusted under 35 U.S.C. 154(b) by 0 days.

(21) Appl. No.: 18/300,366

(22) Filed: Apr. 13, 2023

(65) Prior Publication Data

US 2024/0027230 A1 Jan. 25, 2024

Related U.S. Application Data

(63) Continuation of application No. 29/792,396, filed on Mar. 28, 2022, now Pat. No. Des. 1,060,279.

(60) Provisional application No. 63/362,910, filed on Apr. 13, 2022.

(51) Int. Cl.
*G01D 4/00* (2006.01)
(52) U.S. Cl.
CPC ..................... *G01D 4/006* (2013.01)
(58) Field of Classification Search
None
See application file for complete search history.

(56) References Cited

U.S. PATENT DOCUMENTS

| 10,198,017 | B2* | 2/2019 | Chamarti | H04L 67/10 |
| 11,719,729 | B2* | 8/2023 | Collins | G01R 22/068 |
| | | | | 340/870.02 |
| 2009/0135836 | A1* | 5/2009 | Veillette | H04L 45/34 |
| | | | | 370/400 |
| 2009/0146838 | A1* | 6/2009 | Katz | H04B 7/155 |
| | | | | 370/310 |
| 2012/0218120 | A1* | 8/2012 | Ree | H04Q 9/00 |
| | | | | 340/870.07 |
| 2013/0191659 | A1* | 7/2013 | Ree | H04L 12/12 |
| | | | | 713/310 |

(Continued)

FOREIGN PATENT DOCUMENTS

| CN | 115200651 A | * 10/2022 | |
| FR | 2950778 A1 | * 4/2011 | ........... H04W 48/18 |
| KR | 20040042828 A | * 5/2004 | |

OTHER PUBLICATIONS

FR-2950778-A1 English Language Translation (Year: 2011).*
CN-115200651-A English Language Translation (Year: 2022).*
KR 20040042828 A English Language Translation. (Year: 2004).*

*Primary Examiner* — Curtis A Kuntz
*Assistant Examiner* — Jerold B Murphy
(74) *Attorney, Agent, or Firm* — William Simmons; Simmons Patents (57) ABSTRACT

The inventions generally relates to an apparatus and method (hardware and operating modes) for a DUAL TRANSCEIVER BOARD MODULE (DTBM) that can be used as an Automatic Meter Reading device (AMR/AMI) for data generators such as utility meters. The DTBM comprises a plurality of transmitter technologies/boards that communication over a plurality of networks such as a public network, cellular network, common carrier network and a third-party network. The apparatus comprises a dual or milti transceiver board set and the methods related to using such an apparatus.

16 Claims, 9 Drawing Sheets

(56) References Cited

U.S. PATENT DOCUMENTS

2022/0361023 A1\* 11/2022 Luo ...................... H04L 1/1864

\* cited by examiner

| TRANSCEIVER CRITERIA (80) | | | |
|---|---|---|---|
| Criteria | RF Transceiver | Cellular Transceiver | Meaning |
| DTBM MODES | | | |
| Endpoint Mode | 1 | 1 | 1 – DTBM in Endpoint Mode<br>0 – DTBM not in Endpoint Mode |
| Collector Mode | 0 | 0 | 1 – DTBM in Collector Mode<br>0 – DTBM not in Collector Mode |
| Mixed Mode | 0 | 0 | 1 – DTBM in Mixed Mode<br>0 – DTBM not in Mixed Mode |
| Cellular Gateway Mode | 0 | 0 | 1 – DTBM in Collector Mode<br>0 – DTBM not in Collector Mode |
| On-Site Communication Mode | 0 | 0 | 1 – DTBM in Comm Mode<br>0 – DTBM not in Comm Mode |
| Sleep Mode | Put BTBM in a Sleep mode – wake up after magnet swipe and go back to sleep if no encoder com is detected in X hours unless exception applies | | |
| AVAILABILITY DATA | | | |
| Cellular Available (cellular network status) | N/A | 1 | 1 – Available<br>0 – Not Available |
| Base Station Available (base station status) | 1 | N/A | 1 – Available<br>0 – Not Available |
| Bubble Up Drive By (schedule dependent) | 0 | N/A | 1 – Available<br>0 – Not Available |
| Bubble Up Walk By (schedule dependent) | 1 | N/A | 1 – Available<br>0 – Not Available |
| Consumption Change Flag (change in consumption dependent) | 1 | 1 | 1 – Transmit Data Signal (Change > Minimum)<br><br>0 – Do not Transmit Data Signal |
| Maximum Skip Flag (only skip X number of transmission) | 0 | 0 | 1 – Do Not Transmit Data Signal<br>0 – Transmit Data Signal |
| HISTORICAL DATA | | | |
| Historical Success Rate Cellular | N/A | 98% | Successful Cellular Communications |
| Historical Success Rate Base Station | Channel 1: 95%<br>Channel 2: 90% | N/A | Successful Base Station Communications |
| Historical Success Rate Bubble Up Drive By | Channel 1: 90%<br>Channel 2: 84% | N/A | Successful Bubble Up Drive By Communications |
| Historical Success Rate Bubble Up Walk By | Channel 1: 0%<br>Channel 2: 99% | N/A | Successful Bubble UP Walk By Communications |
| | | | |

Fig. 8

| DATA SIGNAL FORMAT (82) ||
|---|---|
| CODE | FORMAT |
| M1 – MESSAGE 1 (Primary Read) | UID, MID, MCMRV, Status Code, Checksum |
| M2 – MESSAGE 2 | UID, MID, MCMRV, Status Code, Time HH/MM, Day of Week, Data Log extracts, Ambient Temp, Checksum |
| M3 – MESSAGE 3 | UID, MID, MCMRV, Status Code, Delta Value for MCMRV : last 4 collected reads, Delta Value for MCMRV : 2 hours; Delta Value for MCMRV : 3 hours, Delta Value for MCMRV : 4 hours, Checksum |
| M4 – MESSAGE 4 | UID, MID, MCMRV, Status Code, Number of Days Leak, Reset code of last Endpoint watchdog event, Number of Endpoint watchdog events, 24-Hr Peak Flow Rate, Lifetime Peak Flow Rate, Number of days with same MID, Checksum |
| M5 – MESSAGE 5 | Schedule: 12 am to 5 am UID, MID, Noon readings over the past 5 days (sent as deltas from the most recent noon reading), Checksum |
| M6 – MESSAGE 6 | Leak Flag Active only: UID, MID, MCMRV, Status Code, 15min reads for last two hours, Checksum |
| M7 – MESSAGE 7 | UID, MID, Encoder battery value, Encoder watchdog count, Encoder K factor, Encoder Major_Minor Soft., Endpoint Major_Minor Soft., Endpoint Battery value, Decimal Units, Units Code, Number of Transmissions Life Time (by 100), Checksum |

UID = User Identification
MID = Meter Identification
MCMRV = Most Current Meter Register Value (consumption data)

DUAL TRANSCEIVER BOARD MODULE

CLAIM TO PRIORITY

This application claims priority to application Ser. No. 29/792,396, filed on 28 Mar. 2022, and claims the benefit of provisional application 63/362,910, filed on 13 Apr. 2022, of which the entire contents of such reference are hereby incorporated herein by this reference for all that it discloses for all purposes.

FIELD OF THE INVENTION

The present invention generally relates to an apparatus and method (hardware and operating modes) for a DUAL TRANSCEIVER BOARD MODULE that can be used as an Automatic Meter Reading device (AMR/AMI) for utility meters using any one of a public network, common carrier network and a third-party network. The apparatus comprises a dual transceiver board set and the methods related to using such an apparatus.

BACKGROUND OF THE INVENTION

A diverse spectrum of technologies are used today to collect information from remote devices. Such information can be called data or intelligence and is collectively called "data." Many systems need to transfer data between devices, including consumption measuring devices such as utility meters (electric, gas, water, etc.), quantification measuring devices (e.g., sensors), and mechanical devices (e.g., remote shutoff valves). Such systems' communication technologies include Radio Frequency carrier wave (RF), telephony (cell-phone networks), satellite, wire and cable telecommunications, and often analog and digital communications. Such data may be optically transmitted via fiber optic cable or across open areas, by induction with electric or magnetic fields through adjacent separate coils or a transformer and, in many cases, through such technologies. The data is often relayed from source to destination, sometimes across great distances, and sometimes locally (as in a building), by a combination of RF networks, wired networks, cellular networks, common carrier networks, and a plurality of computer systems, all working cooperatively to transfer information.

The disclosed technology seeks to address the problems associated with transferring data to and receiving data from devices installed in challenging environments for wireless communications. Applications of the disclosed technology include pit-mounted, wall-mounted, and pole-mounted utility meters (aka "endpoints") for measuring water consumption. Such devices are often mounted at or below ground level, are powered by a battery, and should operate without failure for up to 20 years.

In one embodiment, the disclosed technology utilizes dual-radio technologies in one radio device and is particularly well suited for water utility meter applications. While prior art endpoint radios use all kinds of radio technologies, none use a dual-radio design, as disclosed in this document, that can be selectively engaged in real-time to transfer primary data while being powered by a battery. The design and cost criteria for the disclosed technology are challenging, especially when used by a battery-powered endpoint associated with a utility meter installed at or below ground level and configured to last up to 20 years without changing or recharging the battery. The disclosed technology meets such challenges.

BRIEF DESCRIPTION OF THE INVENTION

Aspects and advantages of the invention are set forth below in the following description or may be evident from the description or may be learned through the practice of the invention.

One embodiment of the present invention is an apparatus comprising a battery-powered dual-radio Automatic Meter Reading (AMR) device for utility meters. The apparatus may include a housing defining a top section and a bottom section and may be configured for housing a dual-radio board set. The device may further comprise a dual-radio board set disposed in the housing. The dual-radio board set may comprise a first transceiver board that communicates with a first network and a second transceiver board that communicates with a second network. A board connector may connect said first transceiver board and the second transceiver board to define a board gap between such boards. The board gap may be the distance between the first transceiver board and the second transceiver board. A processor is disposed on one of the first transceiver board or the second transceiver board where the processor is configured to control both the first transceiver board and the second transceiver board. When the processor is installed on the first transceiver board, the first transceiver board may operate normally without the presence of the second transceiver board (and vice versa). At least one memory is in communication with the processor, where the memory is suitable for storing logic and endpoint-data. The device may further comprise a first interface providing a communication path between the dual-radio board set and a data source such as a meter's register. The first interface is suitably configured for transferring data between the dual-radio board set and the meter register. The device may further comprise a battery for powering at least the dual-radio board set.

A first logic may be stored in the memory and the processor may be configured for executing the first logic to (a) format an endpoint data signal comprising at least part of the endpoint-data, (b) select one of said first transceiver board or said second transceiver board to transmit the endpoint data signal, and (c) determine when to transmit the endpoint-data signal.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 8 is a table of exemplary transceiver criteria;

Repeated use of reference characters throughout the present specification and appended drawings is intended to represent the same or analogous features or elements of the present technology.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of an explanation of the invention, not a limitation of the invention. It will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Construction Aids

As used herein, the terms "first," "second," and "third" may be used interchangeably to distinguish one component from another and are not intended to signify the location or importance of the individual components. As used herein, the term "in sync" means at the same time and for the same linear distance.

As used in the claims, the definite article "said" identifies required elements that define the scope of embodiments of the claimed invention. In contrast, the definite article "the" merely identifies environmental or contextual elements that provide context for embodiments of the claimed invention that are not intended to be a limitation of any claim. For example, "the bar" is an environmental element and not a claim limitation, and the term "said bar" is a claim limitation. Further, all references to an "object" in the preamble and body of the claims are for contextual purposes only and are not intended to limit any claim.

As used herein, the terms "upstream" and "downstream" refer to the relative location of components in a fluid pathway. For example, component A is upstream of component B if fluid flows from component A to component B. Conversely, component B is downstream of component A if component B receives a fluid flow from component A.

As used herein, the term "axial" refers to a direction of flow through an object; the term "radial" refers to a direction extending away from the center of an object or normal to the "axial" direction, and the term "circumferential" refers to a direction extending around the circumference or perimeter of an object.

For this document, two or more items are "mechanically associated" by bringing them together or into a relationship with each other in any number of ways, including a direct or indirect physical connection that may be intended to be releasable (e.g., snaps, rivets, screws, bolts, etc.) and connections that not intended to be easily disconnected such as (e.g., welding, sowing, etc.) and connections that are intended to be movable (e.g., rotating, pivoting, oscillating, etc.). For example, items merely "mechanically associated" are broader embodiments of items that are "mechanically associated using bolts."

Similarly, for this document, two items are "electrically associated" by bringing them together or into a relationship with each other in many ways. For example, methods of electrically associating two electronic items/components include: (a) a direct, indirect or inductive communication connection and (b) a direct/indirect or inductive power connection. Additionally, while the drawings may illustrate various components of the system connected by a single line, it will be appreciated that such lines may represent one or more connections or cables as required for the embodiment of interest.

This document includes headers that are used for place markers only. Such headers are not meant to affect the construction of this document and are not in any way related to the meaning of this document nor should such headers be used for such purposes.

DESCRIPTION

Figure 1:
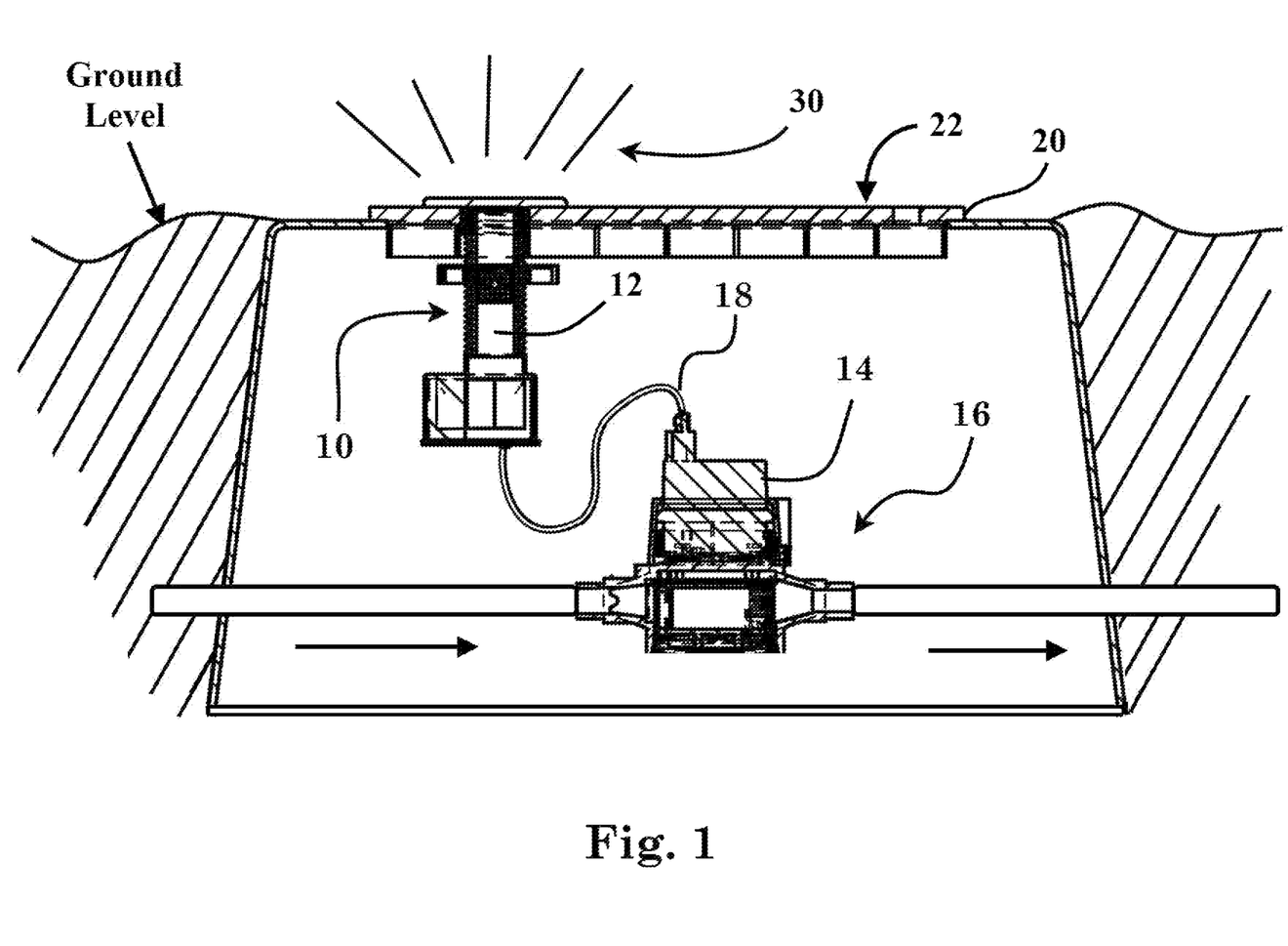
FIG. 1 is a view of a pit-mounted apparatus connected to the electronic register of a utility meter.
Figure 2:
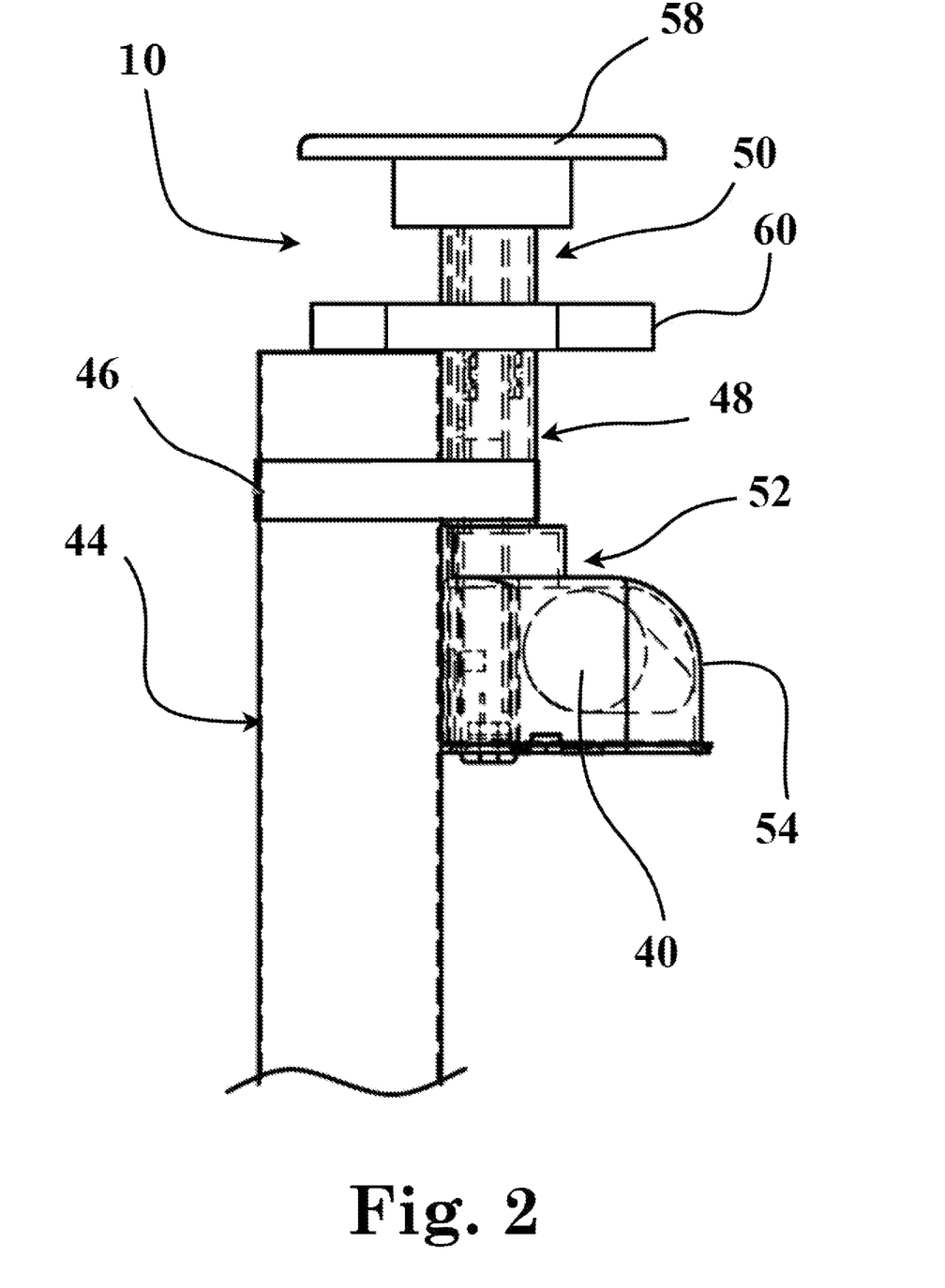
FIG. 2 is a view of a pole-mounted apparatus.
Figure 3:
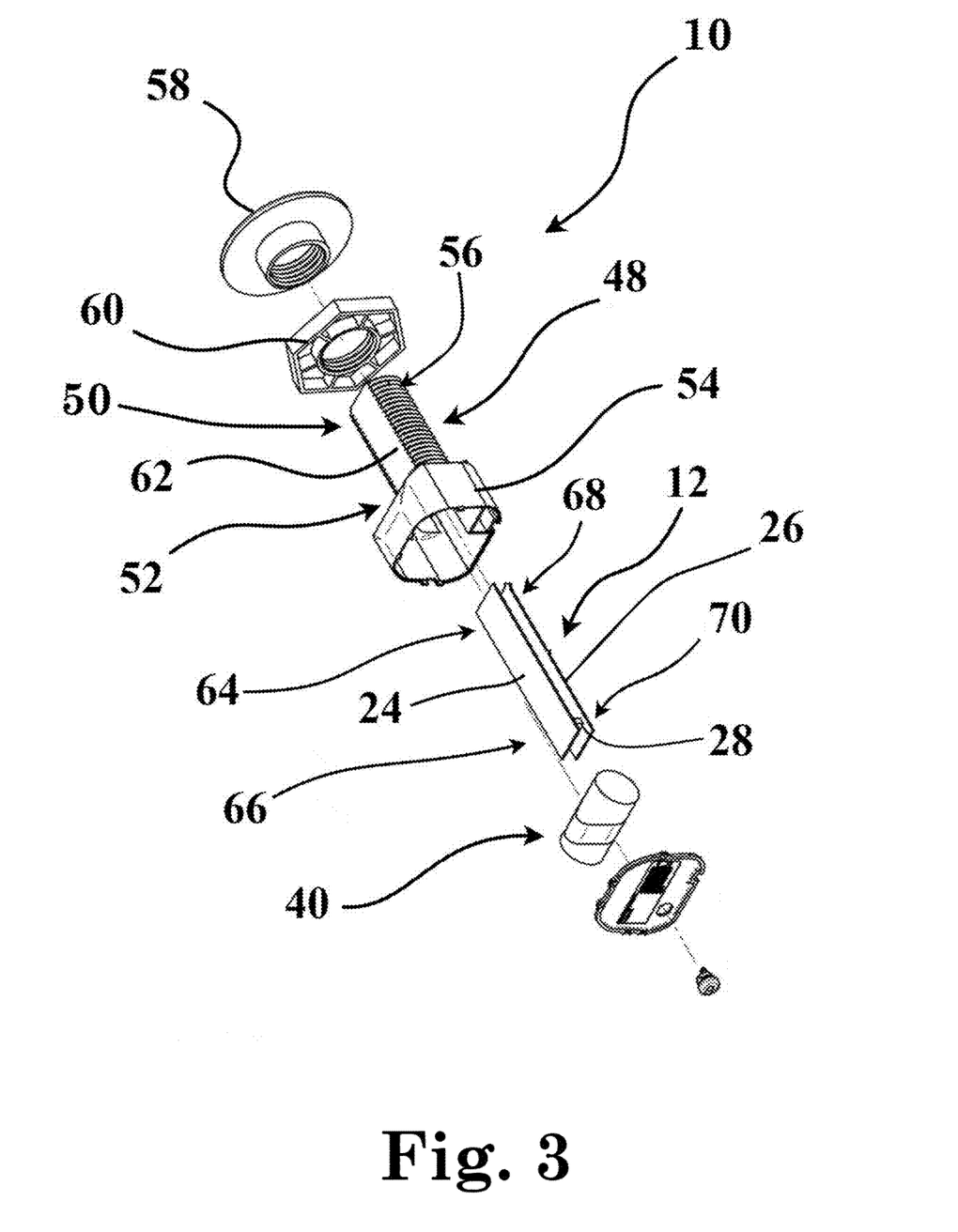
FIG. 3 is an exploded view of the apparatus in FIG. 1.

Referring to FIG. 1 through FIG. 3, one embodiment of a battery-powered Automatic Meter Reading (AMR) device is presented. For the current embodiment, the AMR device may be referred to as a dual transceiver board module (DTBM) 10 comprising a dual-radio board set 12 electrically associated with the register 14 of a prior art water utility meter 16 through a wired or wireless interface connection 18. For the current embodiment, a wired connection 18 is used. For one embodiment, the meter 16 is installed in a meter pit covered by a pit lid 20, defining an outer surface 22. The outer surface 22 is generally at ground level, as depicted in FIG. 1.

The local meter 16 is one example of an "Endpoint" for this document. An Endpoint is a device that may generate certain "endpoint-data" that is transferred to a DTBM 10 and transmitted to a remote device. As used in this document, endpoint-data may be any type of data, including system data and meter data. Examples of system data may be data related to the health of the "system" of which the DTBM 10 is a part, such as a system component failure notification. Meter data may be data related to a particular meter and may include consumption, status, diagnostic, and environmental data.

The dual-radio board set 12 may comprise a first transceiver board 24 that communicates with a first network. The first transceiver board 24 may be connected to a second transceiver board 26 that communicates with a second network. A board connector 28 may be used to connect the first transceiver board with the second transceiver board. Both boards are configured to transmit an endpoint signal 30 for transferring endpoint-data over a "network" to a remote device associated with a utility company data collection system. The board connector 28 may be used to connect the first transceiver board 24 and the second transceiver board 26 and to define a board gap 32 between the two boards as depicted in the various figures (see FIG. 4 as one example).

For the current embodiment, the DTBM 10 may be designed to communicate through a "network," which in this document, includes a public network (e.g., cellular network), a common carrier network, a proprietary network, or a third-party network without hardware modifications to the DTBM 10. For example, the first transceiver board 24 may generate a 450 MHz endpoint signal 30 that may be intercepted by a remote receiver in communication with a utility company's communication system (e.g., a drive-by receiver, a walk-by receiver, or a fixed location receiver, etc.). Alternatively, the second transmitter board 26 may generate a cellular endpoint signal 30 that is transferred to the utility company's data collection system over a cellular network.

A processor 34 may be disposed on one of the first transceiver board 24 or the second transceiver board 26. The processor 34 may be configured to control both the first transceiver board 24 and the second transceiver board 26. At least one memory 36 may be in communication with the processor 34 and may comprise any one of, or a combination of, on-chip memory, on-board memory, local off-board memory or remote memory (i.e., cloud memory). The memory 36 may be configured to store both logic routines and endpoint-data.

For the current embodiment, a first logic 38 may be stored in the at least one memory 36, wherein said processor 34 is configured for executing said first logic to (a) format an endpoint data signal 30 comprising at least part of the endpoint-data, (b) select one of the first transceiver board 24 or the second transceiver board 26 to transmit the endpoint data signal 30, and/or (c) determine when to transmit the endpoint-data signal 30. The first logic 38 will be discussed in detail below.

The DTBM 10 may further comprise a power source 40, such as a battery. For embodiments where power source 40 is a battery, such a battery may be a long-life, non-replaceable battery configured to power the dual-radio board set 12, including the processor 34, the memory 36, and other dual-radio board set 12 components. As will be discussed below, one goal of the processor 34 and the first logic 38 is to minimize the system's impact on the battery to achieve a 10 to 20-year life without recharging or replacing.

For the current embodiment, the meter 16 is a water meter owned by a water utility company and comprises a register 14 configured to measure and document water consumption. The DTBM 10 may be electrically associated with the register 14 through an endpoint interface 42. Such endpoint interface 42 may be configured to receive a wired connector 18 that may exit from the bottom of the DTBM 10 module. Alternatively, a short-range wireless technology (e.g., Bluetooth) may be used to transfer data between the register 14 and DTBM 10. As described below, the DTBM 10 may have a plurality of endpoint interfaces 42.

As depicted in FIG. 1, the utility meter 16 is installed in a meter pit. The DTBM 10 may also be pole-mounted (or wall mounted—not shown), as depicted in FIG. 2, where the DTBM 10 is mechanically associated with a support structure such as a pole 44 by a mechanical pole connector 46 (e.g., band, strap, stainless/nylon/rubber/plastic other no rust or low rust material). One of ordinary skill in the art will appreciate that there are many configurations for mounting and using the DTBM 10 without departing from the scope and spirit of the invention.

Housing

As best seen in FIG. 3, the DTBM 10 comprises a housing 48 defining a top section 50 and a bottom section 52 configured for housing a dual-radio board set 12. While the housing is described using the term "section," the various "sections" may be sections of one integral component as depicted in FIG. 3. The bottom section 52 may further define a power source compartment 54 configured for receiving a power source such as a battery 40. The top section 50 may define a housing hat interface 56 configured for receiving a housing hat 58. The housing 48 body may define threads configured for receiving a housing nut 60. As depicted in FIG. 3, such threads may also define at least part of the housing hat interface 56. The housing 48 body may define a hollow cylindrical shape of sufficient size to receive the dual-radio board set 12. At least one side of the housing 48 body may define a mounting interface 62, which may be particularly useful in pole-mounted configurations, as depicted in FIG. 2. For the current embodiment, the housing 48 body defines two mounting interfaces opposed 180 degrees apart (e.g., one on the "front surface" and one on the "back surface").

Dual-Transceiver Board

Figures 4, 5:
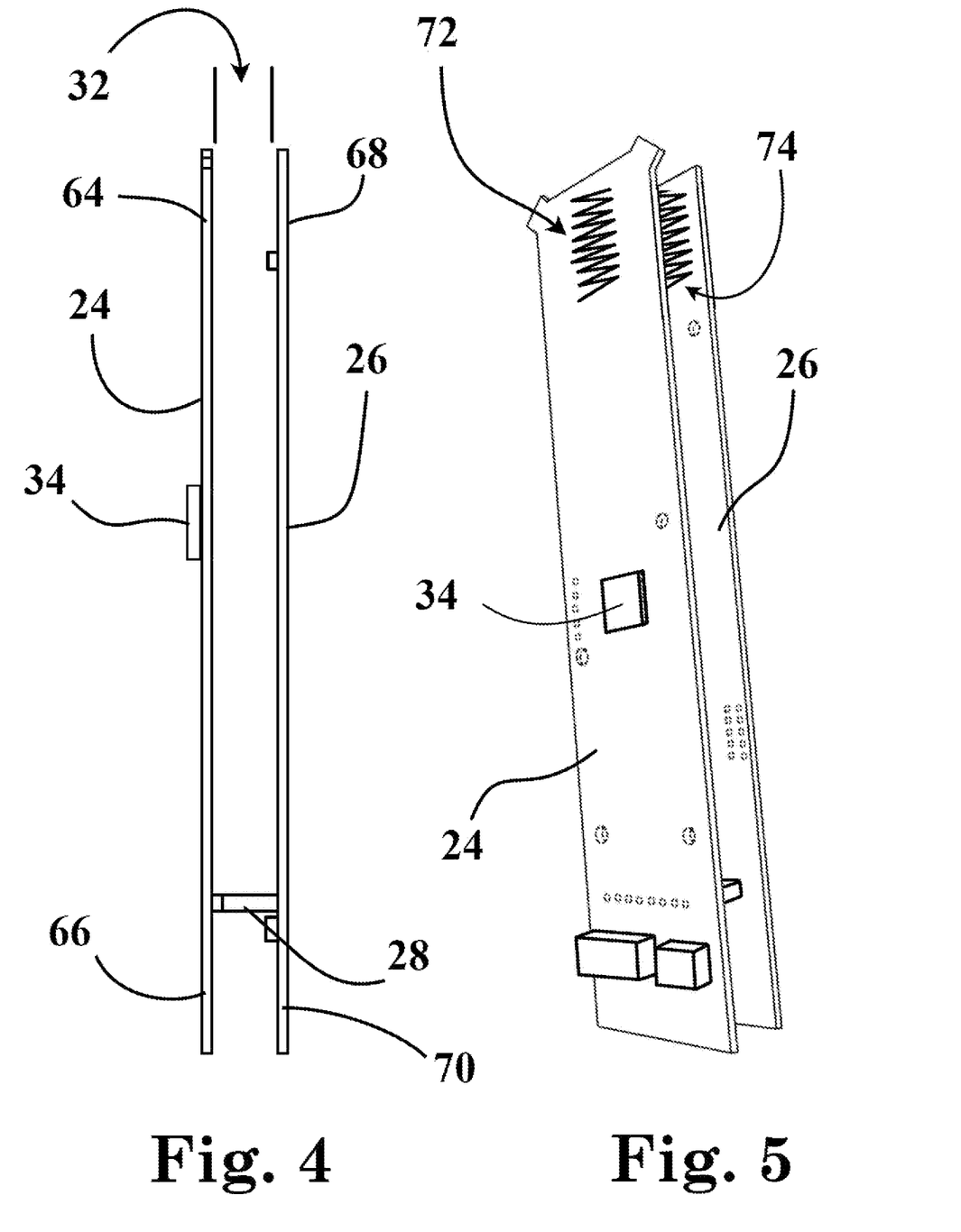
FIG. 4 is a side elevation view of a dual board set.
FIG. 5 is a side perspective view of a dual board set.

As best seen in FIG. 3, FIG. 4, and FIG. 5, the dual-radio board set 12 comprises a first transceiver board 24 connected to a second transceiver board 26. It should be appreciated that one or both of the transceiver boards may define a transmitter only with the "receiver functions" being performed by a third board. For the current embodiment, the first transceiver board is an RF Transceiver board (RFTB) 24, and the second transceiver board is a Cellular Transceiver Board (CTB) 26. It should be appreciated that both RFTB 24 and CTB 26 use RF technology. The term "RF Transceiver Board" is simply a way of distinguishing the RFTB 24, designed to communicate over non-cellular networks, from the CTB 26, designed to communicate over a cellular network. The RFTB 24 may define an RFTB first end 64 and an RFTB second end 66. Similarly, the CTB 26 may define a CTB first end 68 and a CTB second end 70. The boards may be mechanically and electrically associated using board connector 28, which may be configured to separate the boards by a predefined board gap 32 (FIG. 4). As discussed in more detail below, for the current embodiment, the board connector 28 connects the transceiver board's second ends defining a board gap 32 which may be between 5 mm and 55 mm.

The RFTB first end 64 may further define an RFTB trace antenna 72, and the CTB first end 68 may define a CTB trace antenna 74. One of ordinary skill in the art will appreciate that other types of antennas may be used, including coil antennas, patch antennas, chip antennas, and off-board antennas. As shown in FIG. 5, RFTB trace antenna 72, and CTB trace antenna 74 are co-located when the boards are connected together using board connector 28. Such provides similar RF environments for both antennas. For the current embodiment, both antennas will be close to ground level, as depicted in FIG. 1.

The board gap 32 may be selected according to an antenna tuning process for such co-located antennas. As noted above, when the dual-radio board set 12 is inserted into the housing 48, the RFTB first end 64 and CTB first end 68 may be adjacent to the housing 48 top section 50. The top section 50 may be configured to receive the board set in a way that maintains the predefined board gap 32 at the boards' first ends. For the current embodiment, the board gap 32 is ideally 11 mm but can be between 5 mm and 55 mm. For one exemplary tuning process, the board gap is set to be as wide as possible while allowing the RFTB first end 64 and the CTB first end 68 to be inserted into the housing 48 top section 50 so that they extend into or through the water meter pit lid as depicted in FIG. 1 when the DTBM 10 is associated with a pit lid as depicted in FIG. 1. Such allows the RFTB and CTB first ends to extend to the plane defined by the outer surface 22 of the water meter pit lid. Once the gap between the co-located antennas is known, the tuning circuits can be adjusted to minimize interference between the antennas.

Figure 6:
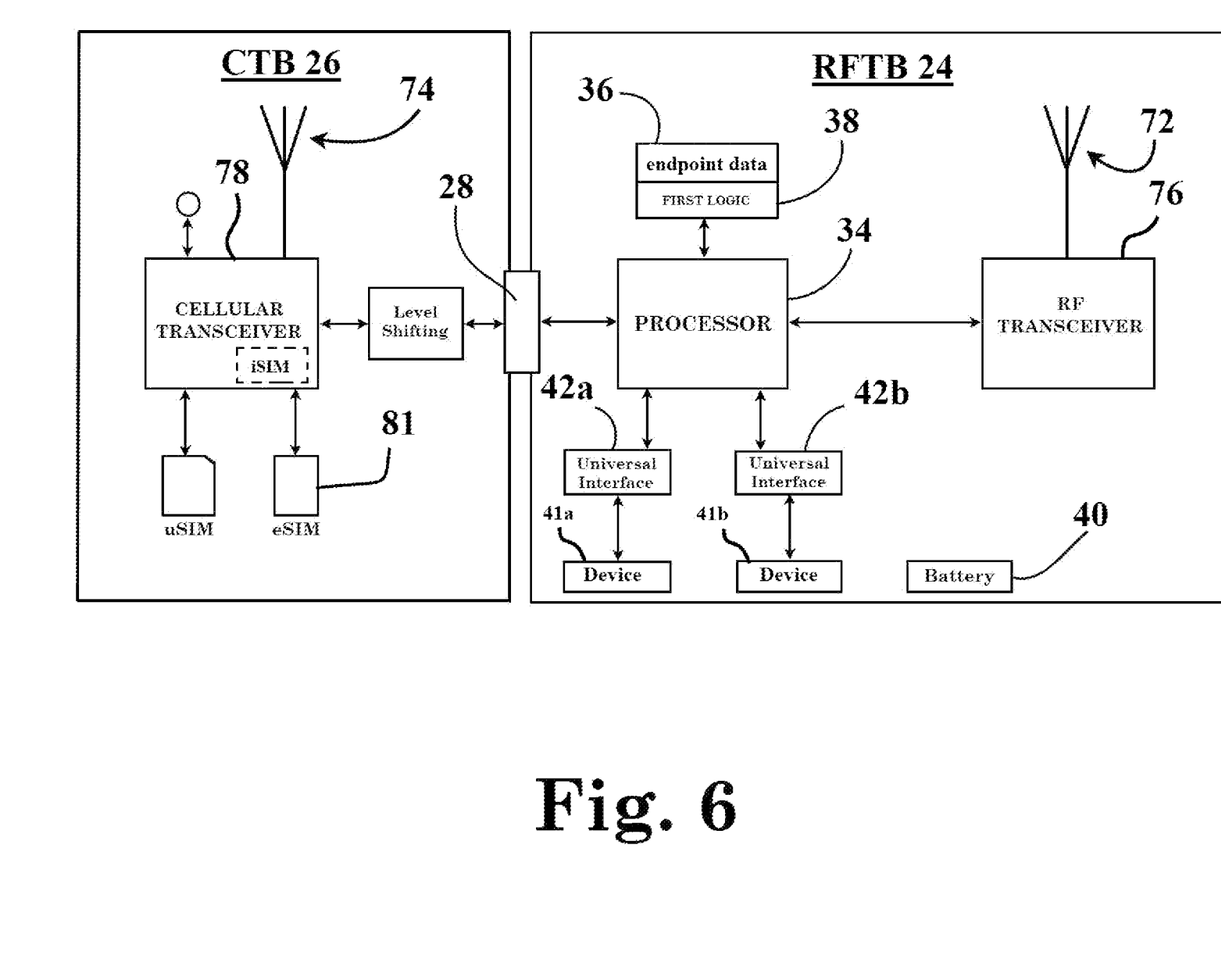
FIG. 6 is a block diagram representation of one embodiment of a dual board set.

For the current embodiment, the DTBM 10 is potted in resin to prevent water/moisture ingress into the housing 48 body. Depending on the resin used, such typically makes the DTBM 10 a "throw-away" device, as repairs may become more costly than replacement. In contrast, a re-enterable potting material (such as those sold by Aquabond®) may also be used to make repairs more economically feasible, Exemplary Block Diagrams Referring now to FIG. 6 and FIG. 7, block diagram representations of a Dual Transceiver Board Module (DTBM) 10 electronics are considered. As explained above, the DTBM 10 comprises an RFTB 24 and a CTB 26 that may be connected together by a board connector 28. The board connector 28 may be a female/male type connector pair that allows easy board connections and separations. As depicted in the various figures, the outer perimeter of the transceiver boards may define a rectangular shape and may be positioned parallel relative to each other at a predefined distance that defines board gap 32. At least one processor 34 is disposed on one of the RFTB 24 or the CTB 26. For the current embodiment, the processor 34 is disposed on the RFTB 24. It will be appreciated that for such a configuration, the RFTB 24 may be used without a CTB 26 board, but the CTB 26 must be connected to the RFTB 24 board to be used by the DBTM 10. Alternatively, a processor 34 could be disposed on the CTB 26 or the CTB 26 may have its own processor.

At least one memory 36 (on-chip, off-chip or both) is electrically associated with and is in communication with the processor 34. The memory 36 may store a first logic 38 and data such as endpoint data. For the water utility meter 12 in this example, endpoint data includes consumption data representing the amount of water that flows through the meter 12 to be consumed by a customer (for example). Processor 34 uses the first logic 38 to control communications between accessory devices, RFTB 24, CTB 26, and remote devices. There may be a plurality of interfaces, each configured to connect to a local accessory device. For the current embodiment, there is a first endpoint interface 42a and the second endpoint interface 42b configured for electrically connecting a plurality local accessory device 41, such as a utility meter 12. The processor 34 may be configured to transmit data between the DTBM 10 and accessory devices 41. Such data may become part of an endpoint signal 30. Any accessory device with the appropriate interface can be used, such as shutoff valves and IoT Devices. One such IoT device may be an Information Module configured to transfer endpoint data to a consumer's smartphone allowing the consumer to monitor his water consumption in "real-time."

For one embodiment, at least one of the first endpoint interface 42a or the second endpoint interface 42b, in electrical communication with the processor 34, defines a "universal interface" configured for connecting to any number of appropriately configured accessory devices. Exemplary accessory devices include external pressure devices, leak detection devices, switching devices (to perhaps turn off the flow of water through the meter 12), temperature devices (to generate a warning that a freeze level temperature could damage the water meter), and water sensors to warn of water in the meter pit. Thus, as used here, a universal interface is an interface that can connect to and communicate with a plurality of accessory devices without the need for hardware changes.

As is the case for the current embodiment, endpoint interfaces 42 are typically used for programming functions or receiving data from external devices. For one alternative embodiment, at least one of the endpoint interfaces 42 may be configured with a magnetic switching element that switches connections between communication lines and power lines. A battery or photovoltaic accessory may be connected to an endpoint interface and used to supply power to the endpoint to provide a backup, diagnostic, or charging function.

For one embodiment, at least one of the interfaces 42 may be connected to an external power source and be further configured with a magnetic switching element configured to connect such an external power source to the DTBM 10 power supply circuits, and disconnect the communication lines, when a magnetic element is placed near the magnetic switching element.

The communication connection between processor 34 and the local accessory device 41 may be a two-way communication connection. The data transferred may be any type of data, such as endpoint data. The endpoint data comprises status data, diagnostic data, environmental data, and consumption data. Environmental data relates to the DTBM 10 environment (e.g., temperature, water, light, moisture, etc.). An abnormal change in light relative to historical data can represent someone accessing a typically dark meter pit (perhaps to tamper with the meter) or an obstruction blocking the meter from a typical light source (such as parking a truck over a meter pit or beside a pole mounted meter 12). Further, if the light sensor normally has access to the sun, the light sensor data can be used as a crude verification of clock information (i.e., it is dark at 11:00 pm).

Figure 7:
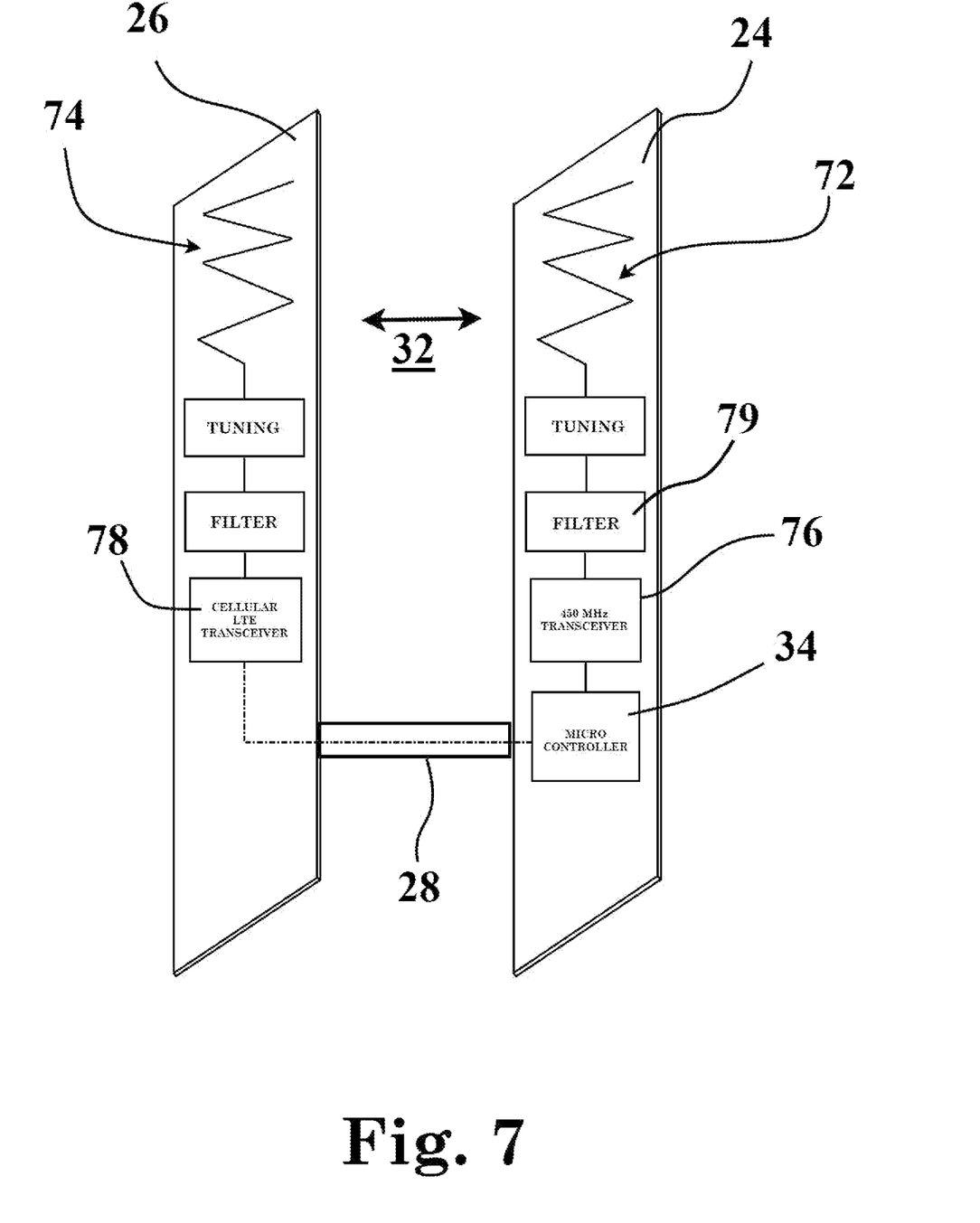
FIG. 7 is a block diagram of an exemplary RF Transceiver Board and an exemplary Cellular Transceiver Board.

As depicted in FIG. 7, which shows a back view relative to FIG. 4 and FIG. 5, the RFTB 24 may define a trace antenna 72, which may be in communication with an RF transceiver circuit 76 in communication with processor 34. Similarly, the CTB 26 may define a trace antenna 74, which may be in communication with a cellular transceiver circuit 78. The RF Transceiver circuit 76 and Cellular Transceiver circuit 78 may comprise one or more chips or electronic components. The transceiver boards are positioned so the antennas are co-located and separated by a board gap 32 to minimize energy absorption from one antenna to the other. Each board has an RF Filter 79 (e.g., bandpass filter) between its transceiver circuit and a matching/tuning network that may be further connected to its respective antenna. The matching/tuning networks may be designed to minimize the effects of an adjacent, close proximity antenna relative to the antenna connected to the tuning network while also being effective for embodiments not having a co-located antenna, such as when the second board is removed. Thus, the filters may have a narrow bandwidth that matches the requirements for the respective transceiver to minimize energy transfers between antennas. The matching/tuning networks may be configured to provide optimum coupling between the transceiver circuit and the antenna.

The processor 34 may be further configured to use the first logic 38 to control the transmission of the endpoint signal 30 by configuring the endpoint signal according to predefined transceiver criteria 80 and predefined data signal format criteria 80. Exemplary transceiver criteria 80 are presented in FIG. 8, and exemplary data signal format criteria are presented in FIG. 9.

Transceiver Criteria

For one embodiment, the first logic may define a dynamic transmitter mode where the processor 34 may use a plurality of processes to determine which transceiver board to use and how to format the transmitted endpoint signal 30. For the current embodiment, there are two processes. A first process may be called a SIM Process, and a second process may be called a Reliability and Efficiency Process.

As described in detail below, the SIM Process checks to see if the SIM 81 on the DTB 46 is activated. If it is, the DBT 46 board is selected to transmit the endpoint signal 30. The Reliability and Efficiency Process selects which board will transmit the endpoint signal 30 after considering transmitter criteria and attempting to maximize efficiency for at least one of the dollar costs, power costs, and reliability costs for transmitting the endpoint signal 30.

For the current embodiment, the transmitter criteria 80 may comprise DTBM Mode, Availability Data, Historical Date (i.e., historical communication success values which may include a plurality of historical power level values for a plurality of remote devices, channel selection options, and data signal format options).

DTBM Modes

The first exemplary group of transceiver criteria is referred to as DTBM modes. The DTBM 10 may be configured to operate in a plurality of modes without hardware changes to the dual-radio board set 12. As shown in FIG. 8, exemplary DTBM MODES include an Endpoint Mode, Collector Mode, a Mixed Mode, a Cellular Gateway Mode, and a Coma mode. For the example shown in FIG. 8, the DTBM 10 is in the "Endpoint Mode."

ENDPOINT MODE: In the Endpoint Mode, the DTBM 10 is configured as described in the exemplary embodiment used in this document. The DTBM 10 may be wired or wirelessly connected to a local device, such as the water meter 12 register, using one of the endpoint interfaces 42. Endpoint data may be transferred from the meter 12 register to the DTBM 10. The DTBM 10 may add various data to such data and then transmits an endpoint signal 30 to a remote receiver (such as a collector) associated with a "network" (e.g., common carrier network, cell tower, third-party receiver, LoRaWAN etc.) in communication with a utility company's data collection system.

COLLECTOR MODE: In the Collector Mode, the DTBM 10 is configured to perform the functions of a fixed Collector. A "collector" in an AMR system is a transceiver configured to communicate with a plurality of endpoints and receive and locally store their data (e.g., endpoint data). The collector then transmits the data to a utility company's data collection technology. When used as a collector, the DTBM 10 may be configured to wake (periodically or randomly) and listen for endpoint transmissions. The DTBM 10 may store and aggregate the received data for subsequent transmissions using the CTB 26 (or the RFTB 24 if desired) until the stored data is transferred to a utility company's downstream data system.

MIXED MODE: In the Mixed Mode, the DTBM 10 combines the functionality of an endpoint and a collector as described above. In this mode, the DTBM 10 is connected to a local device (e.g., meter 12) and configured to receive data from the local device and transmit such data to a remote receiver (as described above). The DTBM 10 is also configured to communicate with other remote DTBM devices within the communication range of the DTBM 10. The DTBM may listen for and receive transmissions from other remote endpoints and store and aggregate the received data from such endpoints. The DTBM 10 may then transmit its endpoint's data and the remote endpoints' data to a utility company's downstream data system via any available DTBM transceiver board. The DTBM 10 may also send messages to other DTBM devices.

CELLULAR GATEWAY MODE: In the Cellular Gateway Mode, the DTBM 10 may provide the function of a Cellular Gateway for a fixed collector where the fixed collector is configured to receive non-cellular RF signals (e.g., 450 MHz transmissions) from a plurality of endpoint units. The DTBM 10 may connect to the fixed collector using one of the DTBM 10 Endpoint Interfaces 42, thereby allowing the fixed collector to use the DTBM 10 cellular transceiver (or cellular modem) to transmit data over a cellular network (such as an LTE Network).

ON-SITE COMMUNICATION MODE: Magnetic swiping across the DTBM 10 unit's magnetic sensor (different from the magnetic sensor for connecting a endpoint interface with a power source) will also put the DTBM 10 unit in fast communication mode. Such a mode assists with on-site debugging, updates and changes.

COMA MODE: The DTBM 10 units are shipped to a customer in an extreme-low-power mode called the "coma mode," where power is reduced by about 75%. Such is achieved, for example, by:
1. No active transmitter,
2. No active receiver,
3. Processor active but in low power state,
4. Processor configured to wake and check for a meter connected to an endpoint interface 42 via a preprogrammed interval, and
5. Processor will check for a magnetic interrupt indicating an On-Site Communication request as described below.

The DTBM 10 comprises a magnetic sensor that allows a user to swipe a magnet across the magnetic sensor to "wake" the DTBM 10 unit from the Coma Mode. If no valid local devices are detected connected to one of the endpoint interfaces 42 for a predefined time interval, the DTBM 10 will return to coma mode. For one embodiment, such a predefined time interval is four hours, although any reasonable time interval may be used.

Availability Data

The second exemplary group of transceiver criteria presented in the table depicted in FIG. 8 is Availability Data. As described above, the DTBM 10 may be configured to communicate using a plurality of transmitter technologies. The DTBM 10 comprises a processor 34 that uses a first logic and the transceiver criteria to select which transmitter technology to use (RFTB 24 or CTB 26).

SIM Process

For one embodiment, whether or not the DBTM 10 SIM 81 (uSIM, eSIM, iSIM, etc.) has been activated determines which transmitter to use. An iSIM is integrated into a system's component parts as depicted in FIG. 7. For the current embodiment, an eSIM is used. An eSIM is a digital SIM that allows one to use a cellular service without a physical nano-SIM. The processor 34 checks to see if the eSIM is activated. If the eSIM is activated, the CTB 26 is used to transmit data signals. For the current embodiment, a user may initiate eSIM activation, the DTBM 10 can automatically initiate eSIM activation (no user authorization required), or the DTBM 10 can request a user to activate the eSIM allowing a user to authorize the activation before the activation. SIM 81 activation generally involves contacting the associated MVNO/Carrier to activate the SIM. A user may have an agreement/contract with an MVNO/Carrier to allow automatic activation of eSIMs or to require user authorization before activating an eSIM (or both).

Suppose the DTBM 10 senses a failure of the RFTB 24 or the associated "network" the RFTB 24 uses. The DTBM 10 may automatically initiate the eSIM activation, thereby providing a type of self-healing feature.

Further, suppose that endpoints A, B, C, and D are transmitting an endpoint signal 30 to a collector using RFTB 24. The collector is configured to send a data-success message when data has been received from such endpoints. The endpoints A and D determine that they have not received a data-success message from their associated collector for a predefined communication interval. Endpoints A and D may automatically initiate eSIM activation for endpoints A and D and, once activated, transmit the endpoint signal 30 using the CTB 26. Alternatively, the endpoints A and D may send a notification of the issue to a user and send a request to such user to activate their respective SIM.

Reliability and Efficiency Process

In the examples above, eSIM activation determines the transmitter technology to use; if the eSIM is active, the CTB 26 is used. The First Logic may further utilize a reliability and efficiency algorithm to minimize "costs" (e.g., dollar costs, power costs, reliability costs, etc.) using the various DTBM Modes (80), Availability Criteria (80), Historical Data (80) and Data Signal Format (82).

For such embodiment, one of the criteria that affect technology selection is the availability of remote receiving technology. For example, suppose the DTBM 10 is configured to communicate with either a remote RF Collector or a remote Cellular Network. If the transceiver criteria indicate the RF collector is not operational, but the Cellular Network is operational, the DTBM 10 Cellular Transceiver Board (46) becomes the selected technology (the transition can go either way).

Similarly, the DTBM 10 is configured to transmit an endpoint dta signal 30 in what is referred to as a "bubble up" mode. Such mode may be activated according to a time schedule, and if the current time is outside the scheduled window, such a "bubble up" mode is considered unavailable. In yet another embodiment, the DTBM 10 may be configured NOT to transmit a data signal if the local device's consumption data has not changed (waste of power). Suppose the local device is a water meter 12 measuring water consumption, and it is time to transmit an endpoint data signal 30, but the consumption data has not materially changed since the last transmission. In such a case, the DTBM 10 will skip such a transmission event to save power. Thus, when the data change is less than the minimum change value, the transmitters are considered "unavailable." When a maximum number of skips has been reached, the transmitters are considered available, a data signal is transmitted for such an event, and the Maximum Skip value is reset to zero.

Such a process helps reduce the number of unsuccessful transmission attempts and reduces power costs.

Historical Data

The third exemplary group of transceiver criteria presented in the table depicted in FIG. 8 is Historical Data. As described above, the DTBM 10 may be configured to communicate using a plurality of transmitter technologies. When it is time to transmit a data signal, and both transceiver options are available to transmit the data signal, the processor 34 may consider historical data to make the transceiver technology selection. The processor 34, using first logic 38, may determine that success is critical (i.e., the current data signal must be successful). Under such conditions, the processor 34 may examine the historical data for the transceiver technologies and select the technology with the highest success rate.

If the processor 34 determines the transmission cost is more critical, the processor 34 may select the technology with the lowest cost for transmitting the endpoint signal 30. For example, cellular communication may cost more than non-cellular communication. If so, for low transmission cost, non-cellular technology may be used.

If the power cost is more critical (the power drain on battery 40 is more critical), the processor 34 may select the technology and signal format with the lowest signal payload. Signal "payload" is simply the typical power needed to transmit the data signal for the selected transmitter technology and data signal format.

Data Signal Format (82)

Figure 9:
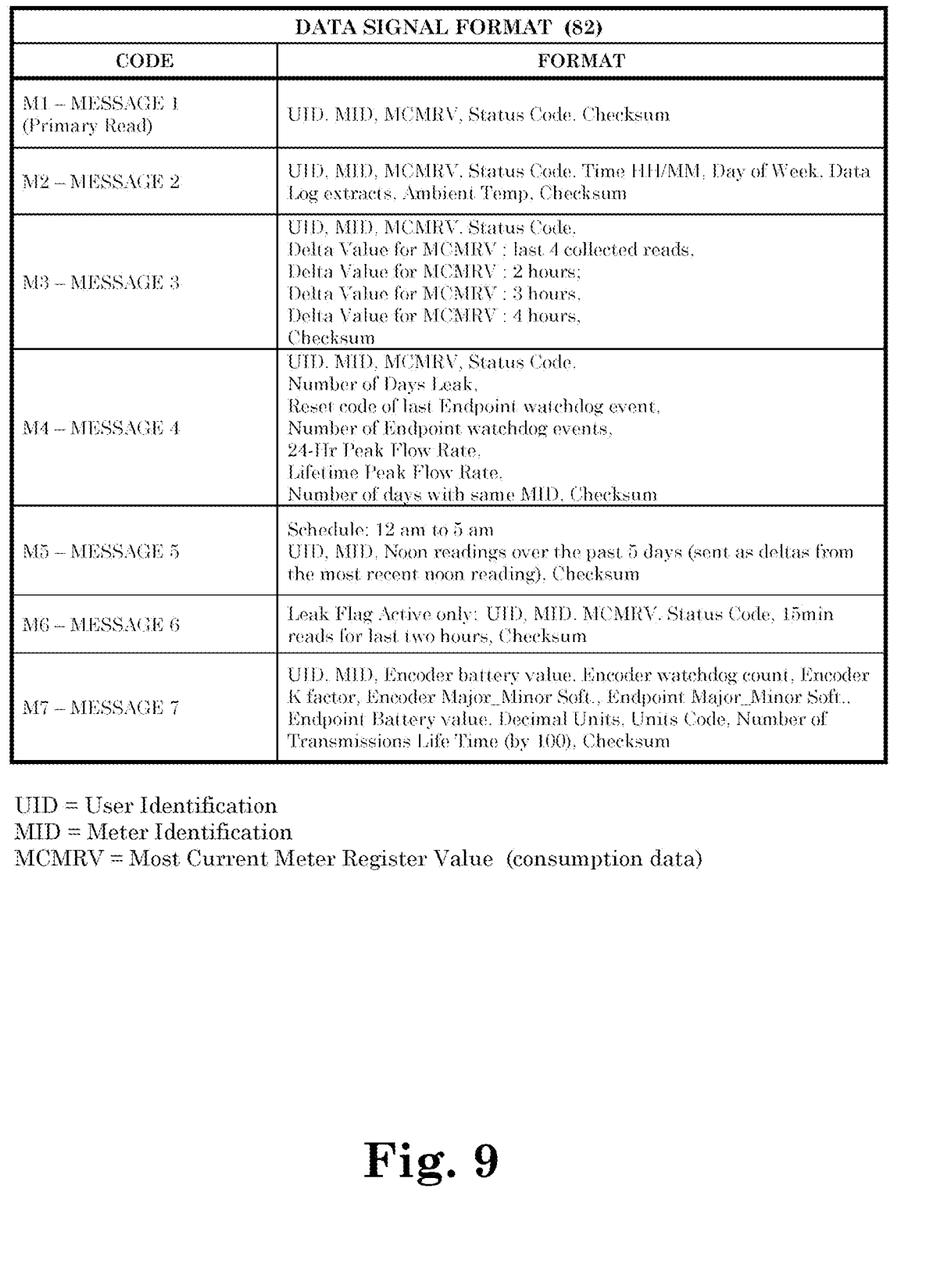
FIG. 9 is a table of exemplary data signal formats.

Exemplary Data Signal Format 82 criteria for formatting an endpoint signal 30 are presented in FIG. 9. Different data signal formats contain different amounts of data to be transferred. For a particular transceiver technology and associated transmitted signal power level, the more data that must be transferred (i.e., the longer the data string), the more power required from memory 38. The amount of power required to transmit a signal is referred to as the signal's "payload." For one example, the resolution of the consumption data value will affect the data string length, with higher resolutions requiring a longer data string. Similarly, the type of data to send affects the signal payload. The data stream length for sending consumption data (only) is less than that for sending consumption data, endpoint diagnostic data, and transceiver board diagnostic data. For the current embodiment, the processor 34 may select the transceiver technology, associated transmitter power level, and the number of transmissions based on the signal payload (i.e., data string length) for a particular endpoint signal 30. For example, the processor 34 may only select the RF Transceiver, set to the minimum transmitter power level assigned to RF Transceiver Channel 1, to transmit a very long data string. Further, such a transmission may only be transmitted once every 15 minutes for 1 hour a day.

RFTB (24) Channels—Avoiding Collisions

The Radio Frequency Transceiver Board (RFTB 24) may use any suitable non-Cellular technologies such as FCC Part 90 (requires a license) transmitter technology and FCC Part 15 (unlicensed) transmitter technology. The RFTB 24 may be a multi-channel 450 to 470 MHz ISM band radio transceiver for the current embodiment. The current embodiment may leverage the multi-channel feature to address signal payload and collision issues. Two signals "collide" when they reach a receiver at the same time. When this happens, the receiver may miss both signals. One way to avoid collisions is to transmit the signals at different times. For one embodiment, suppose there are 20 endpoints, each with an RFTB 24 having five channels (some endpoints being an equal distance from the receiver). Such endpoints are trying to communicate with the same remote receiver. If all 20 signals are transmitted simultaneously on the same channel, there will be signal collisions, and the receiver will likely miss a few signals. Additionally, some endpoints will be further from the receiver, requiring a higher transmitted signal power level to reach the receiver. For such an example, the first logic 38 may assign a predefined power level for each channel, and each channel becomes active at different times. Thus, some of the 20 endpoint signals will be on a different channel and transmitted at different times. By distributing the 20 endpoint signals over the five channels, based on power level, collisions will be reduced while saving power consumption.

One alternative embodiment of the invention comprises means for defining a dual-transceiver board module (DTBM) that defines a battery-powered Automatic Meter Reading (AMR) endpoint device for utility meters. The DTBM 10 may comprise a housing means for housing a multi-transceiver radio means 30. The multi-transceiver radio means 30 may be configured for receiving consumption data from an endpoint (endpoint utility meter) and transmitting a endpoint signal to a remote device. The multi-transceiver radio means 30 may be configured for transmitting the endpoint signal according to predefined transceiver criteria. For one embodiment, the multi-transceiver radio means 30 is configured for being placed in any one of a plurality of modes without hardware modifications to the multi-transceiver. Such modes include an endpoint mode, a collector mode, a mixed Endpoint-Collector Mode, a cellular gateway mode. The transceiver criteria may define historical success rate, and availability data. The transceiver criteria may further define signal format payload data for a plurality of signal formats. The multi-transceiver radio means 30 may be configured to select a transceiver, a signal power level, and a transceiver channel based on said signal format payload data for transmitting the endpoint signal.

First Logic

Figure 10:
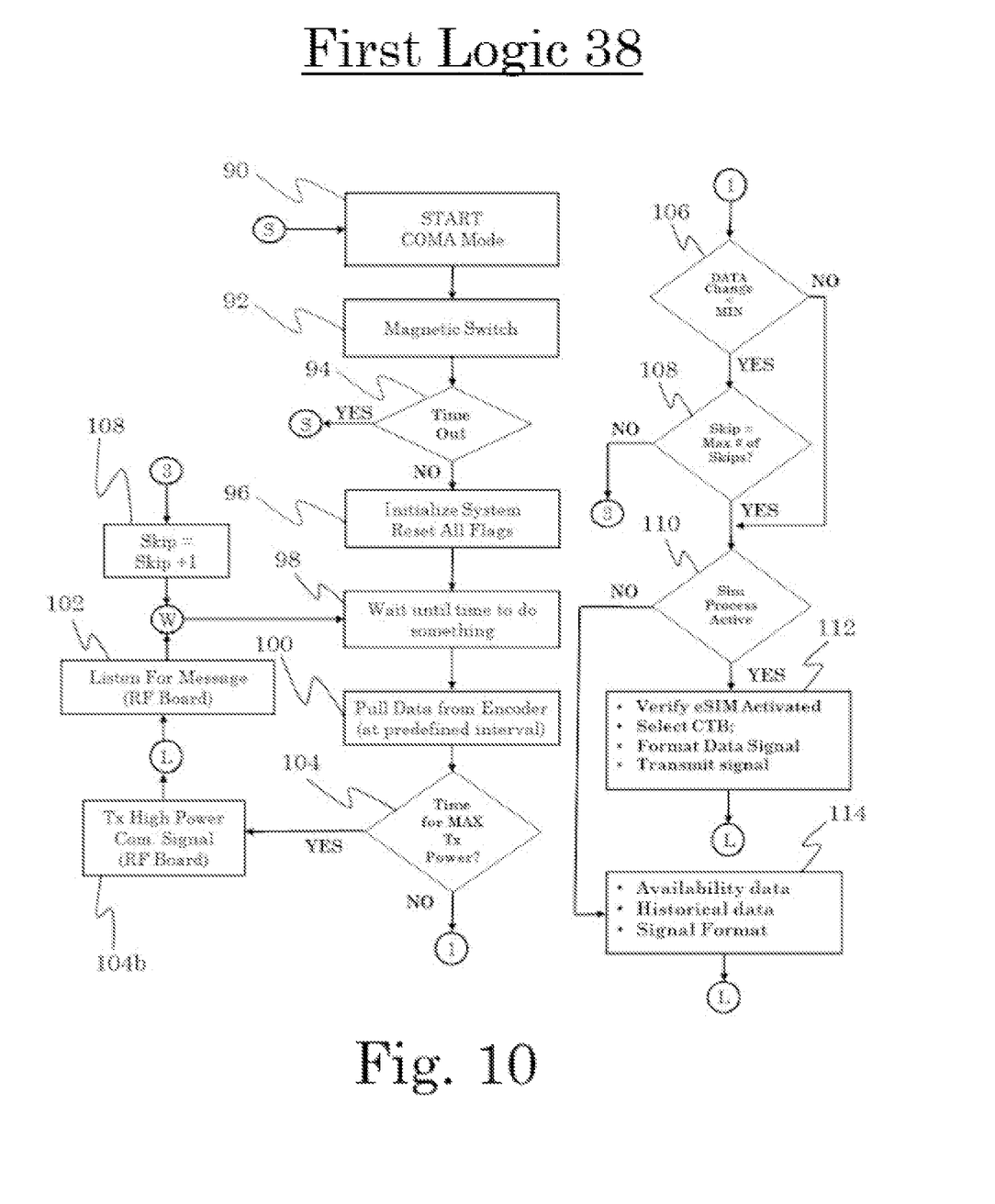
FIG. 10 is a flow chart of an exemplary first logic.

Attention is now directed to FIG. 10, which presents a flow chart of an exemplary First Logic 38. The First Logic 38 starts at step 90 with the DTBM 10 in Coma mode. At step 92, a magnetic field is detected, and the processor 34 starts a wakeup timer. At step 94, if the processor 34 does not detect activity at one of the endpoint interfaces 42 before a time-out value is reached, the DTBM 10 goes back into Coma Mode. If activity is detected, the first logic 38 continues to step 96, where the DTBM 10 is initialized, and all flags and known variable values are set to an initial setting. At step 98, the DTBM 10 waits until it is time to do something. At step 100, in response to a request from a remote device or per a schedule, consumption data is pulled from the endpoint 12 encoder (register) 14. Program control then passes to step 104, and the processor 34 checks to see if it is time to transmit a maximum power level signal. If so, program control jumps to step 104b, where the processor selects the appropriate transceiver board and signal format and transmits an endpoint signal at maximum power level. Such maximum power level transmission is intended to generate a signal with a very high success rate for being received by a remote receiver. Program control then passes to step 102, where the processor 34 listens for a message from a remote device. If a message is received, the processor 34 takes the necessary action and then passes program control to step 98, where it waits for something to do.

If, at step 104, the processor 34 determines it is not time to transmit a signal at maximum power level, program control passes to step 106, where the processor 34 checks to see if the change in consumption data is above a predefined minimum change value. If the change in consumption is below the minimum change value, the processor 34 checks the skip value to see if the skip value is equal to or greater than (should never be greater than—but if so, reset it) the maximum number of skips. If so, the Skip value is reset to zero (or some initial value), the transmission is not skipped, and program control continues to step 110.

At step 110, the processor 34 checks to see if the eSIM Process is active and if so, program control passes to step 112, and the CTB 26 is used to transmit the endpoint signal 30. The signal format routine is executed where the signal is formatted as required, which may include maximizing efficiency for a cellular transmitted signal.

If at step 110, the eSIM Process is not active, program control passes to step 114, and the Reliability and Efficiency Process is followed where power/expense/reliability saving routines are triggered. Step 114 considers the transceiver criteria 80, including the availability, historical data, and signal format criteria. The transceiver board to transmit the endpoint signal 30 may be selected based on such criteria, at least in part, to maximize at least one of the reliability and cost savings (money and/or power costs). Such transmission may be a single transmission or a sequence of transmissions per some communication mode (e.g., bubble up). After the transmission event is completed, program control passes to step 102, where the processor 34 listens for a message from a remote device. If a message is received, Processor 34 takes the appropriate action and control returns to step 98, where it waits for something to do. If no message is received for a predefined time interval, program control passes to step 98, where processor 34 waits for something to do.

For some configurations, while not optimal, it should be appreciated that the transceiver not transmitting a signal may be listening when the other board is transmitting a signal.

Electronics

The DTBM 10 electronic hardware comprises standard components known in the art, although such hardware configuration and control routines are novel. The processor 34 may be a microprocessor that supports standard operating systems and application software as well as ASICs (application-specific integrated circuits) or ASSPs (application-specific standard products), or a PIC (Programmable Intelligent Computer). The processor 34 may comprise onboard ROM, RAM, and EEPROM-type memories (memory 36) for storing data and program code such as firmware and consumption data. A memory external to processor 34 may be used in addition to onboard memory. Processor 34 may be further associated with remote storage, such as cloud storage. For one embodiment, DTBM 10 comprises a DSP/ASSP (not shown) electrically associated with the processor 34 configured to perform signal processing tasks such as voice, audio, video, encoding, decoding, and other data and signal processing functions. Such allows a video sensor, for example, to record images and sound and generate the same.

The communication technology may define a transmitter and/or a transceiver configured to transmit an endpoint signal 30 to a remote device (smartphone, collector, cellular network device, remoter computer, etc.). Embodiments of suitable communication technologies include custom designs. Cellular technology (e.g., LTE), WiFi and Bluetooth transceivers, GPRS, GSM, GPRS, 3G, 4G, 5G and EDGE-enabled networks, and WAP networks are examples of suitable technologies. Such communications may take the form of SMS and e-mail messages.

One of ordinary skill in the art will recognize that the inherent flexibility of computer-based systems allows for a great variety of possible configurations, combinations, and divisions of tasks and functionality between and among components. For instance, methods discussed herein may be implemented using a single server or multiple servers working in combination. Similarly, databases and logic for manipulating the databases may be implemented on a single system or distributed across multiple systems sequentially or in parallel. Data transferred between components may travel directly or indirectly.

The computing or processor systems discussed herein are not limited to hardware architecture or configuration. Embodiments of the methods and systems set forth herein may be implemented by one or more general-purpose or customized computing devices adapted in any suitable manner to provide the desired functionality. The device(s) may be adapted to provide additional functionality complementary or unrelated to the present subject matter. For instance, one or more computing devices may be adapted to provide desired functionality by accessing logic or software instructions rendered in a computer-readable form. When software is used, any suitable programming, scripting, or another language or combination of languages may be used to implement the teachings herein.

Further, software need not be used exclusively or at all. For example, some embodiments of the systems and methods set forth herein may also be implemented by hard-wired logic or other circuitry, including, but not limited to, application-specific circuits. Of course, combinations of computer-executed software and hard-wired logic or other circuitry may be suitable, as well.

As noted above, devices may access one or more computer-readable media that embody computer-readable instructions, which, when executed by at least one computer, cause the computer(s) to implement one or more embodiments of the methods of the present subject matter. Additionally, or alternatively, the computing device(s) may comprise circuitry that renders the device(s) operative to implement one or more of the methods of the present subject matter. Furthermore, components of the presently disclosed technology may be implemented using one or more computer-readable media. Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A battery-powered Automatic Meter Reading (AMR) device for utility meters, said AMR device comprising:
    a housing defining a top section and a bottom section and configured for housing a dual-radio board set;
    a dual-radio board set disposed in said housing and comprising a first transceiver board that communicates with a first network and a second transceiver board that communicates with a second network;
    a board connector configured to connect said first transceiver board and said second transceiver board;
    a board gap defined by the distance between said first transceiver board and said second transceiver board wherein said board gap is defined, at least in part, by said board connector;
    a processor disposed on one of said first transceiver board or said second transceiver board, said processor configured to control both the first transceiver board and the second transceiver board;
    at least one memory in communication with said processor and configured for storing logic and endpoint-data;
    a first interface providing a communication path between said dual-radio board set and a meter register, and wherein said first interface is configured for transferring data between said dual-radio board set and the meter register;
    a battery for powering at least said dual-radio board set; and
    a first logic stored in said at least one memory, wherein said processor is configured for executing said first logic to (a) format an endpoint data signal comprising at least part of the endpoint-data, (b) select one of said first transceiver board or said second transceiver board to transmit the endpoint data signal, and (c) determine when to transmit the endpoint-data signal or respond to a remote request to transmit an endpoint-data signal.

2. The AMR device as in claim 1, wherein said first transceiver board is an RF Transceiver Board (RFTB) and said second transceiver board is a cellular transceiver board (CTB).

3. The AMR device as in claim 2, wherein said RFTB and said CTB each define a rectangular perimeter, each defining a first end and an opposing second end, wherein said RFTB and CTB are parallel to each other, wherein the RFTB first end and the CTB first end are inserted into said housing so that the first ends are located in the top section of said housing and the opposing second ends are located in the bottom section of said housing.

4. The AMR device as in claim 3, wherein said board connector is configured to define said board gap between the RFTB and CTB second ends and the top section of said housing is configured to maintain said board gap at the RFTB and CTB first ends.

5. The AMR device as in claim 4, wherein said RFTB defines a first antenna in communication with an RF transceiver circuit and said CTB defines a second antenna in communication with a cellular transceiver circuit wherein the first antenna and the second antenna are co-located.

6. The AMR device as in claim 5, wherein said board gap is between 5 mm and 55 mm.

7. The AMR device as in claim 5, wherein the board gap is about 11 mm.

8. The AMR device as in claim 2, wherein said dual-radio board set is configured for being placed in any one of a Collector Mode, an Endpoint Mode, a Cellular Gateway mode and a Mixed Mode without hardware changes to said dual-radio board set.

9. The AMR device as in claim 2, wherein said first logic defines a SIM Process and a Reliability and Efficiency Process for selecting the transceiver board that will transmit the endpoint signal, and wherein said processor is configured to use said first logic to select one of said RFTB or said CTB to transmit the endpoint signal.

10. The AMR device as in claim 9, wherein the endpoint data comprises at least one of system data or meter data, wherein said meter data comprises at least one of consumption, status, diagnostic, or environmental data.

11. The AMR device as in claim 9, wherein said processor determines power cost to be the top priority and said Reliability and Efficiency Process uses transceiver criteria comprising a plurality of power levels for a plurality of remote devices and wherein said processor uses the Reliability and Efficiency Process to set the power level for transmitting the endpoint signal for a particular remote device.

12. The AMR device as in claim 11, wherein said RFTB defines a plurality of channels and said transceiver criteria pairs a power level with each of said plurality of channels and wherein the processor sets the power level for a transmitted endpoint signal by selecting one of said plurality of channels.

13. The AMR device as in claim 9, wherein the processor determines transmitted signal success is the top priority, and the transceiver criteria comprises historical communication success rate data and said Reliability and Efficiency Process uses the historical communication success rate data, and wherein the processor uses the Reliability and Efficiency Process to determine which transceiver board to transmit the endpoint signal.

14. The AMR device as in claim 1, wherein said processor is configured to not transmit an endpoint data signal until (a) the endpoint data indicates the change in metered resource consumption has exceeded a predefined change value for a predefined interval or (b) a maximum number of skipped transmissions has been reached or exceeded.

15. The AMR device as in claim 1, wherein said processor is configured for using said first logic to place the AMR device into one of an endpoint mode or a collector mode without hardware modifications to said dual-radio board set.

16. The AMR device as in claim 1, wherein said processor is on said RFTB and where said RFTB is functional without a CTB connected to said connector.

\* \* \* \* \*